(12) United States Patent
Guo et al.

(10) Patent No.: US 10,350,852 B2
(45) Date of Patent: Jul. 16, 2019

(54) SYSTEMS FOR BONDING SURFACES USING A RELEASABLE ADHESIVE

(71) Applicant: GM Global Technology Operations LLC, Detroit, MI (US)

(72) Inventors: Raymond Guo, Seabrook, TX (US); John P. Spicer, Plymouth, MI (US); Yhu-tin Lin, Rochester Hills, MI (US); Ryan C. Sekol, Grosse Pointe Woods, MI (US); Jeffrey A. Abell, Rochester Hills, MI (US); Mark A. Smith, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 640 days.

(21) Appl. No.: 14/938,682

(22) Filed: Nov. 11, 2015

(65) Prior Publication Data

US 2016/0136938 A1   May 19, 2016

Related U.S. Application Data

(60) Provisional application No. 62/079,326, filed on Nov. 13, 2014.

(51) Int. Cl.
*B32B 37/12*   (2006.01)
*B32B 3/26*   (2006.01)
(Continued)

(52) U.S. Cl.
CPC .............. *B32B 3/266* (2013.01); *B32B 5/024* (2013.01); *B32B 5/22* (2013.01); *B32B 5/26* (2013.01); *B32B 7/06* (2013.01); *B32B 7/12* (2013.01); *B32B 25/02* (2013.01); *B32B 25/10* (2013.01); *B32B 25/20* (2013.01); *C09J 7/00* (2013.01);
(Continued)

(58) Field of Classification Search
CPC ....... B32B 7/12; B32B 3/266; B32B 2405/00; B32B 2307/748; B32B 5/024; B32B 5/22; B32B 5/26; B32B 7/06; B32B 25/02; B32B 25/10; B32B 25/20; B32B 2262/0261; B32B 2262/0269; B32B 2262/101; B32B 2262/106; B32B 2264/105; B32B 2307/50; B32B 2307/51; B32B 2307/546; C09J 7/00; C09J 2201/626; C09J 2483/006
See application file for complete search history.

(56) References Cited

U.S. PATENT DOCUMENTS

| 8,685,528 B2 | 4/2014 | Xie et al. |
| 2002/0009568 A1* | 1/2002 | Bries ............... A47G 1/175 428/40.1 |
| 2014/0069578 A1 | 3/2014 | Xie et al. |

* cited by examiner

*Primary Examiner* — Vishal I Patel

(57) ABSTRACT

A releasable adhesive system for joining a first surface to a second surface. The system includes a primary material having a first portion including at least one first-portion molecule configured to be positioned parallel with at least one first-surface molecule of the first surface, and a second portion, opposite the first portion, including at least one second-portion molecule configured to be positioned parallel with at least second surfaced one molecule of the second surface. The first surface molecule, positioned parallel with the first-surface molecule, is configured to maintain bonds between the first portion and the first surface up to one or more pre-determined three scenarios, such as pre-determined shear, pull, and peel forces being exerted on the first surface. The second portion can function similarly with respect to the second surface.

8 Claims, 7 Drawing Sheets

(51) Int. Cl.
*B32B 7/12* (2006.01)
*C09J 7/00* (2018.01)
*B32B 5/02* (2006.01)
*B32B 5/22* (2006.01)
*B32B 5/26* (2006.01)
*B32B 7/06* (2019.01)
*B32B 25/02* (2006.01)
*B32B 25/10* (2006.01)
*B32B 25/20* (2006.01)

(52) U.S. Cl.
CPC ............... *B32B 2262/0261* (2013.01); *B32B 2262/0269* (2013.01); *B32B 2262/101* (2013.01); *B32B 2262/106* (2013.01); *B32B 2264/105* (2013.01); *B32B 2307/50* (2013.01); *B32B 2307/51* (2013.01); *B32B 2307/546* (2013.01); *B32B 2307/748* (2013.01); *B32B 2405/00* (2013.01); *C09J 2201/626* (2013.01); *C09J 2483/006* (2013.01)

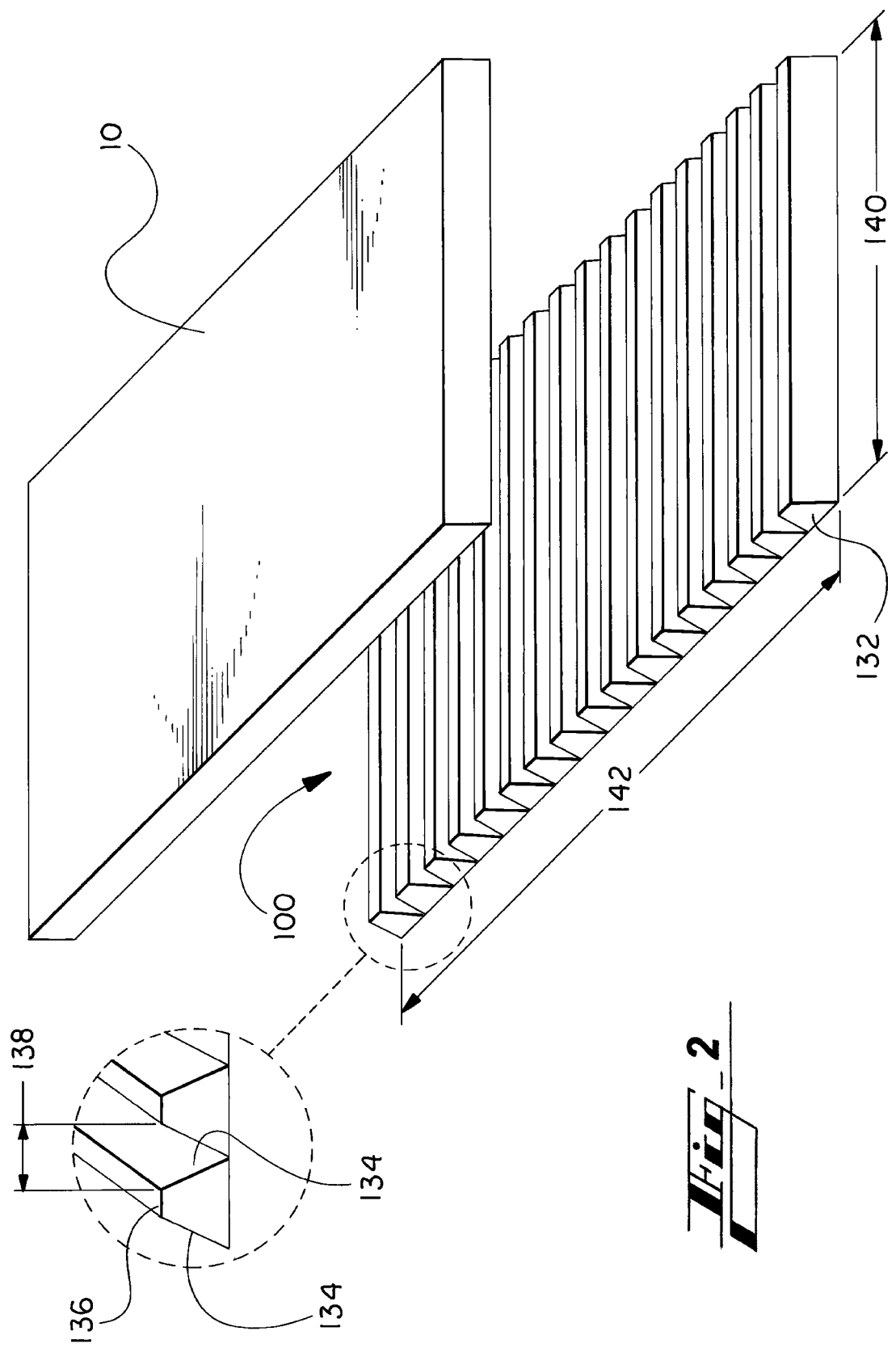
Fig_2

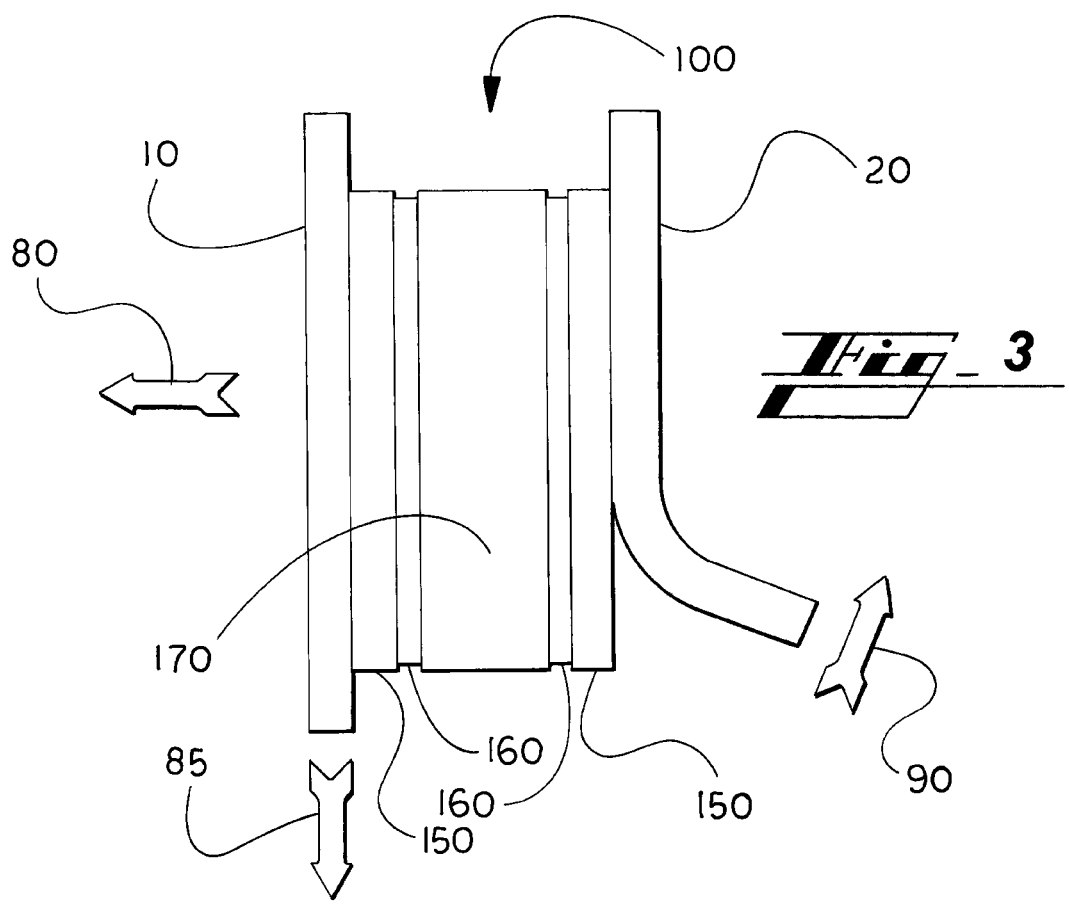
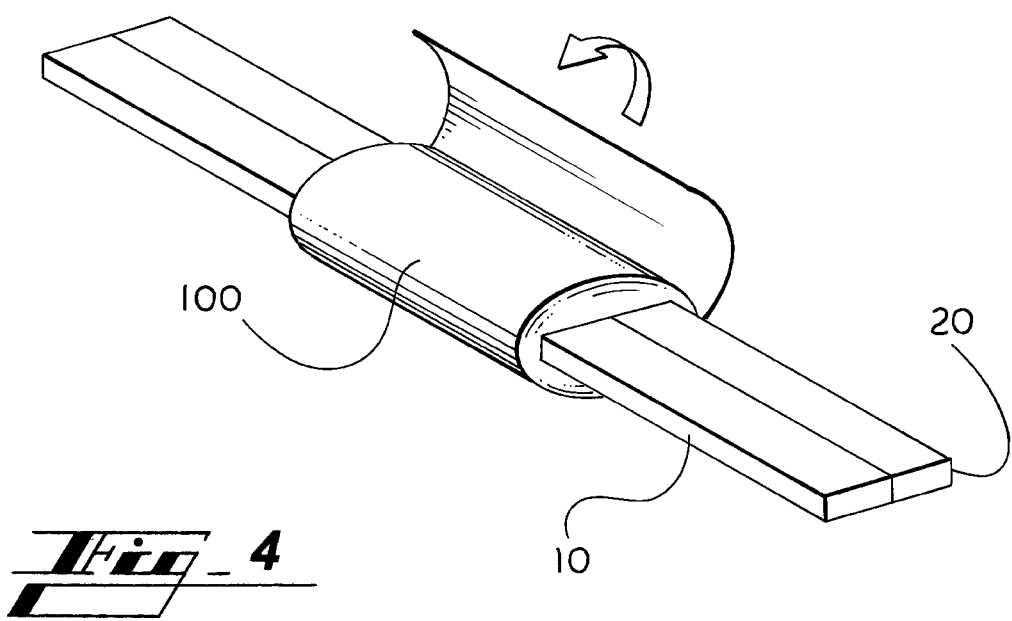

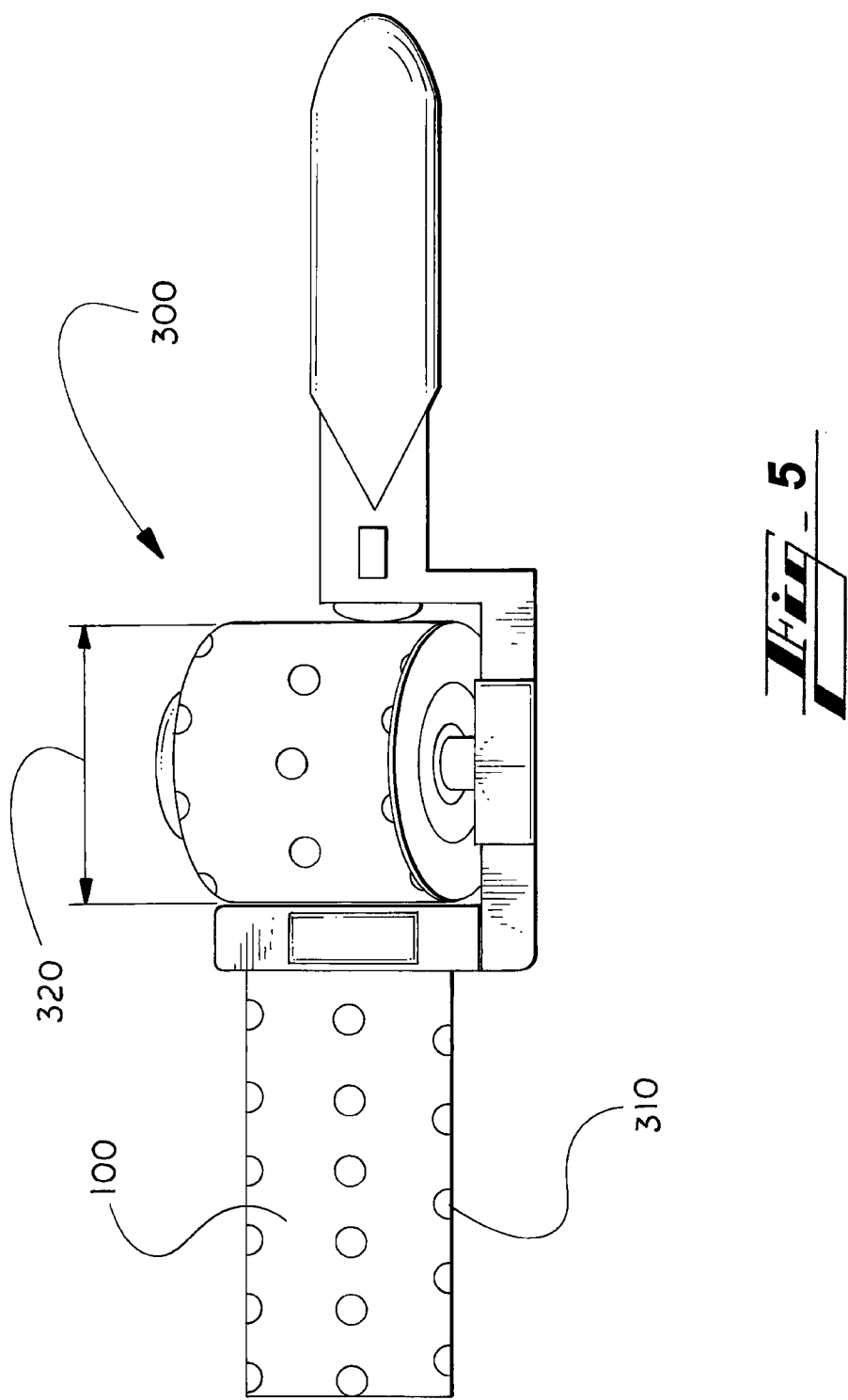

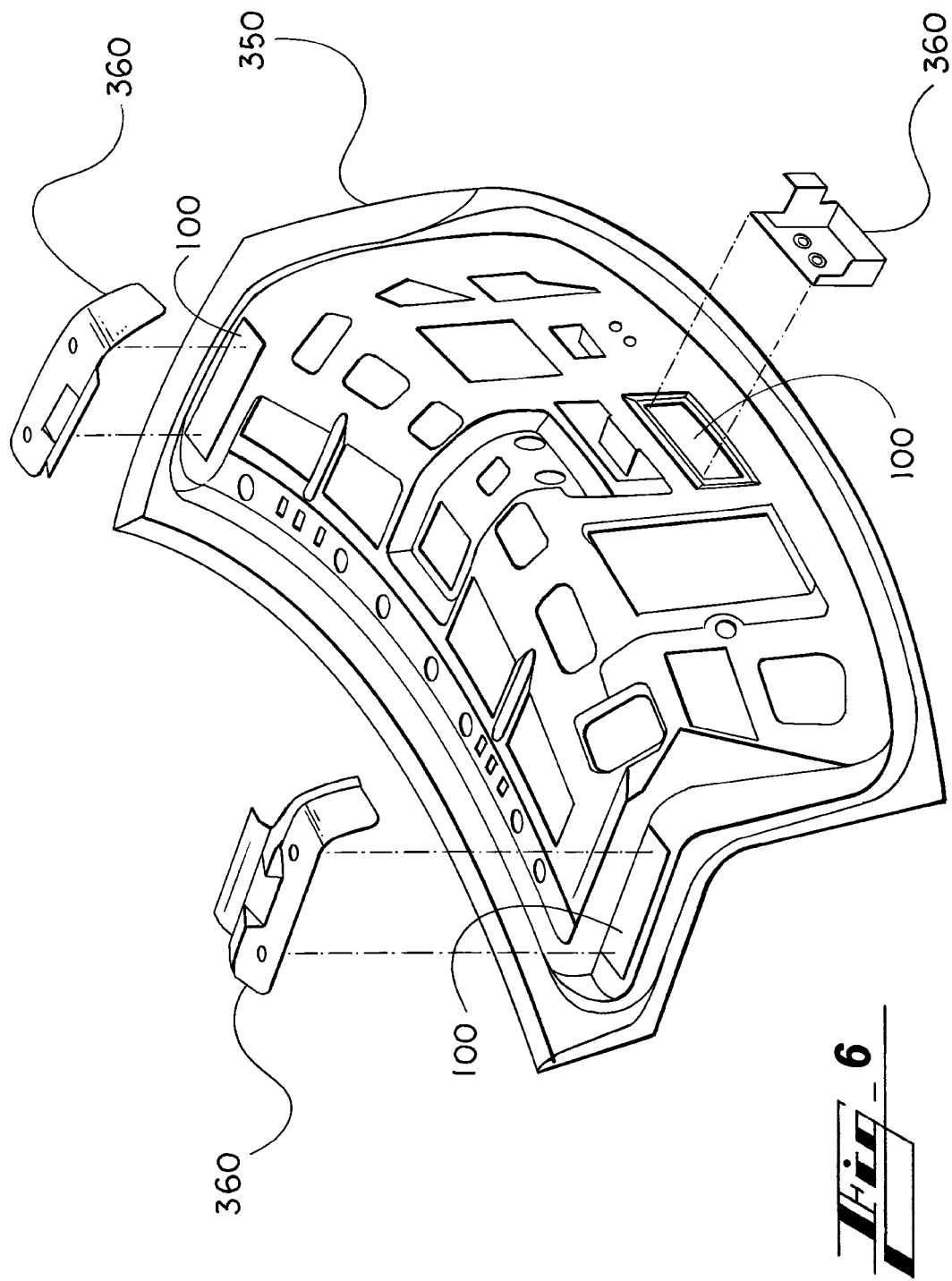

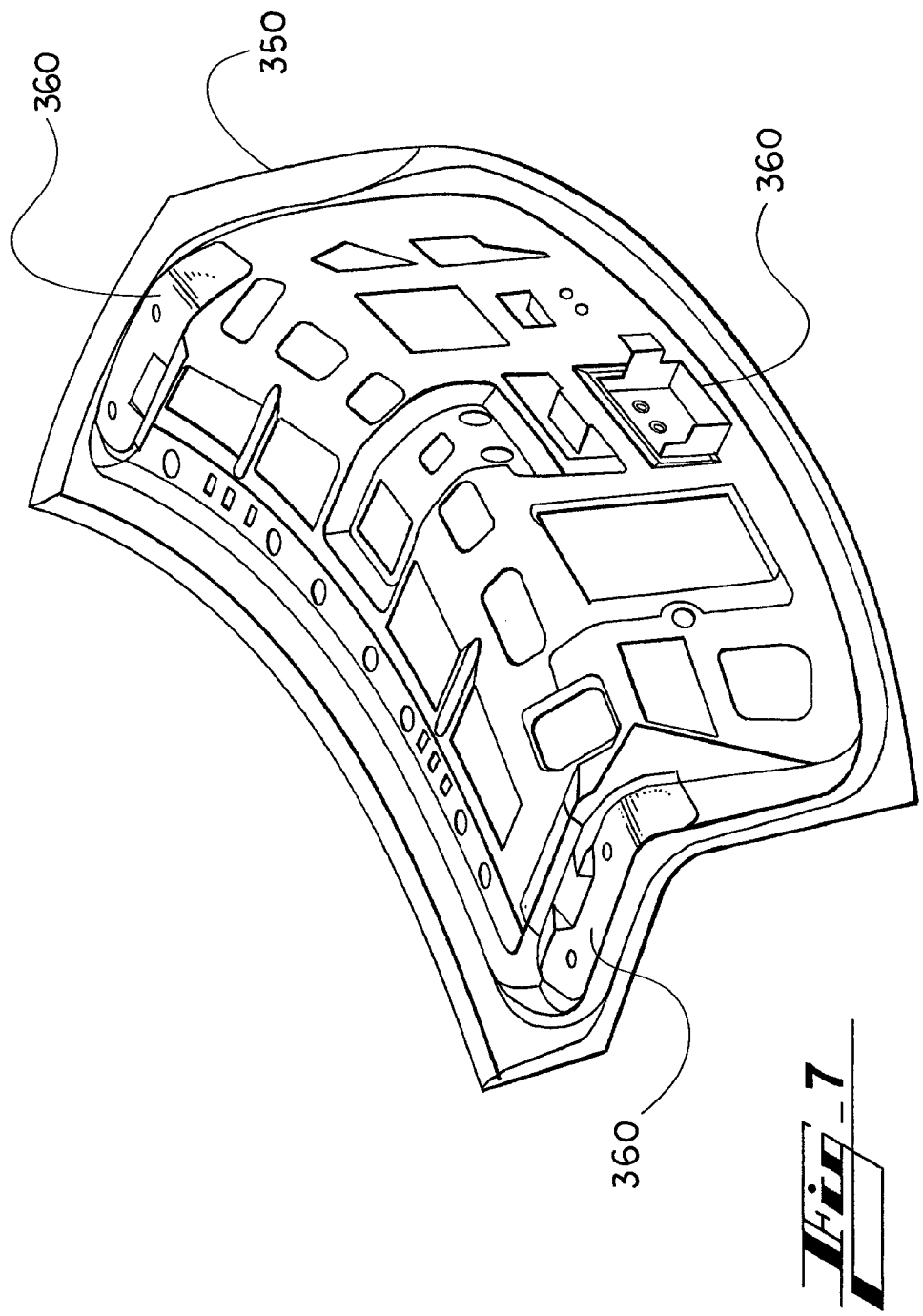

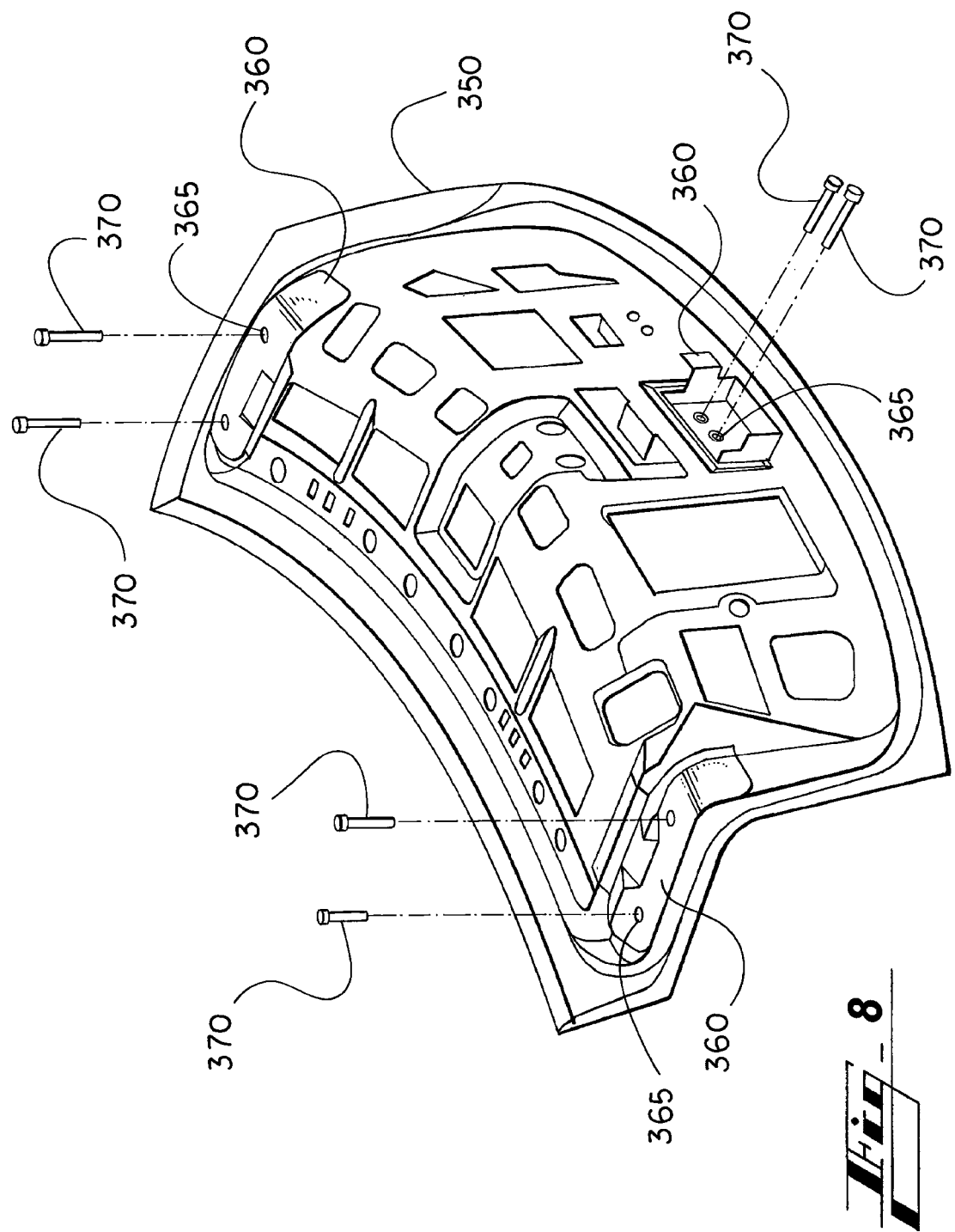

SYSTEMS FOR BONDING SURFACES USING A RELEASABLE ADHESIVE

CLAIM OF PRIORITY

This application claims the benefit of U.S. Provisional Application No. 62/079,326, filed Nov. 13, 2014.

TECHNICAL FIELD

The present disclosure relates generally to systems and method for temporarily or permanently joining two surfaces. More specifically, the present disclosure relates to systems and methods for temporarily or permanently joining two surfaces using a releasable adhesive.

BACKGROUND

Joining surfaces of similar or dissimilar materials can often require extensive processes such as applying permanent adhesives and welding. However, accessing the surfaces after joining, such as by assembly personnel or machinery, can be difficult due to the permanent nature of the adhesives and welds. Limited access to the surfaces can make repairs more difficult.

Permanent joining processes (e.g., ultrasonic welding) can require large capital expenditures for equipment and tooling. Additionally, operations can be interrupted by lengthy changeovers when equipment and tooling need to be replaced.

Reversible joining processes can also be used to join similar or dissimilar materials. For example, magnets are commonly used to join surfaces of ferrous materials temporarily, such as when transporting an object from a staging area to a manufacturing assembly line. Suction connections are also commonly used to join surfaces temporarily in material handling through the use of manual or vacuum-operated suction.

Although magnets and suction connections are reversible in nature, the bond formed can be weakened by impurities on any of the relevant surfaces, which can lead to diminished bonding in the magnetic or suction-based connection. For example, oil or dirt on a surface of a part being joined, or of a magnet or suction cup, can substantially weaken the bond formed at the joining surfaces. Additionally, air pockets present at or in the joining surfaces can lead to a potential loss of connection.

SUMMARY

A need exists for a bonding adhesive that is reversible in nature, or releasable, after installation. The adhesive would have load-carrying capabilities when attached to a surface, and be able to release quickly to disjoin from the surface upon a pre-determined amount of peel force.

The present technology relates to systems including a releasable adhesive having many applications including in commercial industry, the private-sector (e.g., consumer), and manufacturing, among others. The releasable adhesive forms a reversible bond that utilizes van der Waals force to adhere to a surface.

The releasable adhesive system joins a first surface with a second surface and comprises a primary material. The primary material has a first portion including at least one molecule that is configured to be positioned parallel with at least one molecule of the first surface, and a second portion, opposite the first portion, including at least one molecule that is configured to be positioned parallel with at least one molecule of the second surface. The molecule of the primary material positioned parallel with the molecule of the first surface is configured to (i) maintain a bond between the first portion and the attaching surface up to a shear force of a pre-determined amount being exerted on the first surface, (ii) maintain a bond between the first portion and the attaching surface up to a pull force of a pre-determined amount being exerted on the first surface, and/or (iii) release the bond between the first portion and the attaching surface in response to a peel force exerted on the first surface above a pre-determined amount.

In some embodiments, the molecule of the primary material positioned parallel with the molecule of the second surface is configured to (i) maintain a bond between the second portion and the attaching surface up to a shear force of a pre-determined amount being exerted on the second surface, (ii) maintain a bond between the first portion and the attaching surface up to a pull force of a pre-determined amount being exerted on the first surface, and/or (iii) release the bond between the first portion and the attaching surface in response to a peel force exerted on the first surface above a pre-determined amount.

In some embodiments, the primary material includes ventilation holes allowing passage of gas and fumes through the first portion or the second portion.

In some embodiments, the first and second surfaces are permanently joined by fastening at least a section of the first surface to at least a section of the second surface. In some embodiments, the first and second surfaces are permanently joined by welding at least a section of the first surface to at least a section second surface.

Also provided is a method for joining the first surface to the second surface, using the releasable adhesive.

Other aspects of the present technology are described hereinafter.

DESCRIPTION OF THE DRAWINGS

FIG. 2 is a perspective view of an alternative embodiment of the removable adhesive of FIG. 1.

FIG. 3 is a side view of a second alternative embodiment of the removable adhesive of FIG. 1.

FIG. 4 is a perspective view of a third alternative embodiment of the removable adhesive of FIG. 1.

FIG. 5 illustrates a top view of a tape dispenser for applying the releasable adhesive.

FIG. 6 illustrates use of the releasable adhesive of to secure subcomponents to a component in a fixtureless application.

FIG. 7 illustrates the subcomponents and the component of FIG. 6 being temporarily joined using the releasable adhesive.

FIG. 8 illustrates the subcomponents and the component of FIG. 7 being permanently secured using the releasable adhesive and fasteners.

Figure 1:
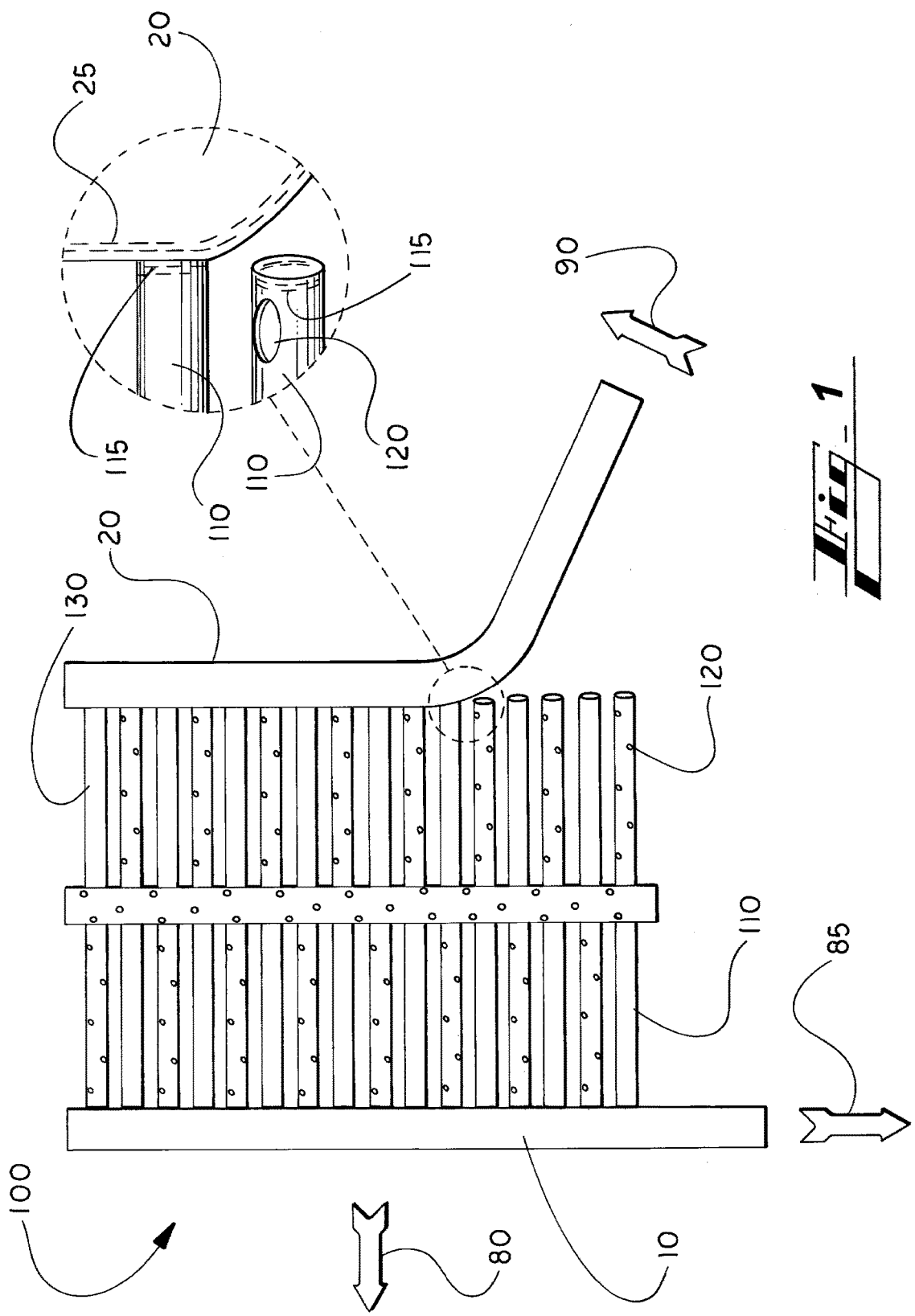
FIG. 1 illustrates a side view of a removable adhesive in accordance with an embodiment of the present technology.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

While the present technology is described primarily herein in connection with automobiles, the technology is not limited to automobiles. The concepts can be used in a wide variety of vehicle applications, such as in connection with aircraft, marine craft, and other vehicles, and consumer electronic components. Additionally, the concepts can be used in a variety of consumer applications, such as electronic components, clothing design (e.g., fasteners and closures), apparel gripping (e.g., work gloves and sports gloves), and signs (e.g., permanent signage for a business and temporary signage for a traffic detour), among others. Furthermore, the concepts can be used in low temperature environments (e.g., aeronautical applications in space) where conventional adhesives lose gripping.

Various embodiments of the present disclosure are disclosed herein. The disclosed embodiments are merely examples that may be embodied in various and alternative forms, and combinations thereof.

I. Overview of the Disclosure

FIG. 1 illustrates a releasable adhesive 100, which allows reversible bonding through the use of van der Waals force. The releasable adhesive 100 adheres and releases from a first surface 10 and a second surface 20 where surface 10, 20 are substantially solid surfaces made of varying materials and textures of the surfaces 10, 20.

The releasable adhesive 100 comprises a primary material 110 that has particles (e.g., molecules, atoms, ions) generally parallel with respect to particles within the first surface 10, the second surface 20. As seen in the callout of FIG. 1, molecules 115 of the primary material 110 are parallel with molecules 25 of the second surface 20, at a location of attachment. Van der Waals force allows the molecules 115 of the primary material 110 to adhere to the second surface 20. Specifically, the molecules 115 of the primary material 110 maintain a bond between the releasable adhesive 100 and an attaching surface (e.g., the second surface 20) against pull forces 80 and shear forces 85.

Unlike a traditional chemical bonding process required by typical adhesives, the releasable adhesive 100 does not require curing, thus allowing the releasable adhesive 100 to adhere to the surfaces 10, 20 almost instantaneously. The releasable adhesive 100 can also adhere to the surface 10, 20 without use of an external power supply, actuator, or otherwise.

Van der Waals force also allows the bond between the molecules 115 of the primary material 110 and the molecules of the attaching surface (e.g., the molecules 25 of the second surface 20) to detach when peel forces 90 are applied to the surfaces attaching surface or the releasable adhesive 100. As seen in the callout of FIG. 1, where the primary material 110 is not in contact with to the second surface 20, the molecules 115 of the primary material 110 are not generally parallel to the molecules 25 of the second surface 20.

In some embodiments, the primary material 110 includes a microstructured and/or a nanostructured polymer, such as silicone and polydimethylsiloxane (PDMS), among others. In some embodiments, the primary material 110 includes polymers such as (functionalized) polycarbonate, polyolefin (e.g., polyethylene and polypropylene), polyamide (e.g., nylons), polyacrylate, acrylonitrile butadiene styrene.

In some embodiments, the primary material 110 includes composites such as reinforced plastics where the plastics may include any of the exemplary polymers listed above, and the reinforcement may include one or more of the following: clay, glass, carbon, polymer in the form of particulate, fibers (e.g., nano, short, or long fibers), platelets (e.g., nano-sized or micron-sized platelets), and whiskers, among others.

The primary material 110 can include synthetic or inorganic, molecules. While use of so-called biopolymers (or, green polymers) is becoming popular in many industries, petroleum based polymers are still much more common in every-day use. The primary material 110 may also include recycled material, such as a polybutylene terephthalate (PBT) polymer, being, e.g., about eighty-five percent post-consumer polyethylene terephthalate (PET). In one embodiment, the primary material 110 includes some sort of plastic. In one embodiment, the material includes a thermoplastic.

In one embodiment the primary material 110 includes a composite. For example, the primary material 110 can include a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite (e.g., plastic composite containing metal reinforcing fibers). The primary material 110 in some implementations includes a polyamide-grade polymer, which can be referred to generally as a polyamide. In one embodiment, the primary material 110 includes acrylonitrile-butadiene-styrene (ABS). In one embodiment, the primary material 110 includes a polycarbonate (PC). The primary material 110 may also comprise a type of resin. Example resins include a fiberglass reinforced polypropylene (PP) resin, a PC/PBT resin, and a PC/ABS resin.

II. Embodiments of the Releasable Adhesive

In the embodiment shown in FIG. 1, the releasable adhesive 100 comprises a plurality of setae 130 (e.g., synthetic setae). Van der Waals force allows the primary material 110 within/on each setae 130 to adhere and release to the surfaces 10, 20 using attractions and repulsions between particles (e.g., atoms, molecules, ions) of the primary material 110 and the surfaces 10, 20.

As described above, van der Waals force allows the molecules 115 of the primary material 110 to attach and detach from the molecules of the attaching surface (e.g., the molecules 25 of the second surface 20), depending on the orientation of the molecules 115 of the primary material 110 and the molecules of the attaching surface. Specifically, the van der Waals force allows the primary material 110 within or on the setae 130 to attach to and peel away from the surfaces 10, 20 to reverse (release) the bond formed between the primary material 110 within/on the setae 130 and the surfaces 10, 20.

Impurities on or in the surfaces 10, 20, such as dirt, oil, and air pockets, do not substantially weaken the overall bond formed by the releasable adhesive 100 because of the many areas of contact between the setae 130 and the surface 10, 20. Specifically, the setae 130 form a plurality of independent bonds with the surface 10, 20, which allows the releasable adhesive 100 to bond even with the existence of some impurities affecting the bond at one or more limited points of interface.

The releasable adhesive 100, including each setae 130, may be designed to have a pre-determined of load-bearing capability. For example, where a load to be bore is from a small object under tension loading, the load bearing capability of the releasable adhesive 100 may be between about 0.1 pounds of force per square centimeter ($lbs/cm^2$) and about 1.0 $lb/cm^2$, wherein the area measurement ($cm^2$) is the surface area of the primary material 110 within/on each setae 130. However, where the object is under shear loading, the load bearing capability of the releasable adhesive 100 may be between about 1.0 and about 20 $lbs/cm^2$.

In some embodiments, as also shown in FIG. 1, the primary material 110 is infused with an embedded material 120. In some embodiments, the embedded material 120 is a material being similar in composition (e.g., material composition or chemical composition) to the primary material 110. In other embodiments, the embedded material 120 is a material different than the primary material 110.

The embedded material 120 can include particles or pathways infused into a molecular structure of the primary material 110. The embedded material 120 may be infused into each of the setae 130 within the primary material 110. Alternatively, the embedded material 120 may be infused into selected setae 130, shown in FIG. 1.

In some embodiments, the embedded material 120 is selected to reinforce strength of the primary material. Reinforcing strength of the primary material allows the primary material to sustain against greater shear forces and pull forces.

In some embodiments, the embedded material 120 may be used to increase electrical and/or thermal conductivity of the primary material 110. For example, doping (e.g., vary placement any numbering of electrons and holes within a molecular structure) can be used to increase conductivity of the primary material 110. Increasing conductivity of the primary material, and thus releasable adhesive 100, may be important in applications where the surfaces 10, 20 need to conduct electricity. For example, doping of the primary material 110 may be suitable in an application where the releasable adhesive 100 serves as a conductor within a battery application.

The embedded material 120 can include a conductive fillers such as, but not limited to, carbon nanotubes, carbon black, metal nanoparticles (e.g., copper, silver, and gold), or combination thereof.

In another embodiment, seen in FIG. 2, the setae 130 are formed into an array of truncated prisms 132. Each truncated prism includes at least one side 134 and at top 136 (seen in the callout of FIG. 1), which serve as flat, generally flat, or smooth surfaces to maximize contact with an attaching surface (e.g., the first surface 10). The van der Waals force that can be exerted on the attaching surface is higher with greater contact area, and so maximizing contact with the attaching surface is a priority in design of the adhesive 100.

In some embodiments the truncated prisms can vary in geometric shape. For example, as seen in FIG. 2, the array of truncated prisms can be formed in the shape of a truncated pyramid, where each pyramid includes two sides 134 and top 136 that are used to generate sufficient van der Waals force for adhesion with the surfaces 10, 20. However, the array of truncated prisms can be in the form of a truncated cone (e.g., sloping or frustro-conical surface), where the side 134 extends around a circumference of a circular base.

Impurities on or in the surfaces 10, 20, such as dirt, oil, and air pockets, do not lead to a substantial weaken the overall bond because of the many areas of contact between the truncated prisms 132 and the surface 10, 20. Specifically, the truncated prisms 132 form a plurality of independent bonds with the surface 10, 20, which allows the releasable adhesive 100 to bond even with the existence of some impurities affecting the bond at one or more limited points of interface.

The array of truncated prisms 132 are extended across a defined width 140. The width 140 can range approximately between 1 millimeter (mm) and 20 mm. The truncated prisms repeat along a defined length 142 with a range similar to the width 140. Spacing between each prism 132 should be sufficient to allow contact to a surface (e.g., the first surface 10). For example, a space 138 between one edges of a first prism 132 and a subsequent prism 132 may be between 10 nanometers (nm) and 200 micrometers (µm).

In some embodiments, the truncated prisms 132 may include the embedded material 120. The embedded material 120 may be added (e.g., doped) into the microstructure of truncated prisms 132.

In another embodiment, seen in FIG. 3 the releasable adhesive 100 may include a plurality of layers including an adhesion pad 150, a skin 160, and a tendon 170. Collectively, the plurality of layers maximize areas of contact with the surfaces 10, 20 while maintaining stiffness a direction of applied loads (e.g., along the fibers of the fabric of the skin 160).

In this embodiment, the adhesion pad 150 (e.g., a polymer elastomer) attaches to the skin 160 (e.g., woven fabric) which is attached to a tendon (e.g., woven fabric). Attaching the adhesion pad 150 to the skin 160 and the tendon 170 provides strength enabling adhesion to maintain against shear force 85 and pull force 80. An example in FIG. 3 illustrates how the first surface 10 is maintained against shear forces 85 and pull forces 80 through stiffness of fabric (e.g., fibers) within the releasable adhesive 100. Additionally, the plurality of layers provide stiffness in a direction of peel loading (e.g., peel force 90), thus enabling release from the attached surface (e.g., the second surface 20 as seen in FIG. 3).

The adhesion pad 150 may include materials that behave elastically within a pre-determined force capacity range of a desired application. The materials should ensure deformation losses (e.g., viscoelastic, plastic, or fracture) in the materials of the adhesion pad 150 are minimized or otherwise reduced. The adhesion pad 150 may include materials such as, but not limited to, silicone, PDMS, and the like. The adhesion pad 150 may have a thickness between 10 nm and 100 nm.

The skin 160 may include similar elastic materials that minimize deformation losses as described in association with the adhesion pad 150. The skin 160 may include woven fabric materials such as carbon fiber fabric, fiber glass, KEVLAR® (KEVLAR is a registered trademark of E. I. du Pont de Nemours and Company of Wilmington, Del.), and the like. The skin 160 may have a thickness between 10 nm and 1 mm.

The tendon 170 may include woven fabric materials with high stiffness fibers such as glass fiber, nylon, and carbon-fiber, among others. The tendon 170 should be of a thickness that sufficient attaches the pad 150 to the skin 160. For example, the tendon 170 can have a length between 1 mm and 100 mm.

The connection between the tendon 170 and the adhesion pad 150 may have pre-defined dimensions, orientation, and spatial location according to particular a desired application. The pre-defined dimension can be altered to balance shear and normal loading requirements for the desired application.

In electrically conductive applications, the pad 150 can be doped with the embedded material 120. For example, the embedded material 120 can include metal nanoparticles as stated above. In some embodiments, the skin 160 and/or the tendon 170 can also be doped electrically conductive materials (e.g., carbon fiber fabric).

Where the tendon 170 attaches to the pad 150 can affect functionality of the releasable adhesive 100. Characteristics such as thickness of the tendon 170, material composition of the tendon 170, and positioning of tendon 170 with respect to the pad 150 can be set in various ways to achieve different results for desired performance in various applications. For example, positioning of the tendon 170 can affecting hanging ability. Attaching the tendon 170 at an edge of pad 150 allows increase strength of the releasable adhesive 100 in the shear direction, as seen in FIG. 3. However, attaching the tendon 170 on an inner surface of the pad 150 allows increased strength of the releasable adhesive 100 in the pull direction.

In another embodiment, seen in FIG. 4 the releasable adhesive 100 (e.g., setae 130, the prisms 132) may be formed as a flexible structure that can be molded to surround or otherwise connect surfaces. For example, the releasable adhesive 100 may function similar to single-sided tape.

In some embodiments, the releasable adhesive 100 can be included on one more than one surface for purposes of adhesion. For example, the releasable adhesive 100 may function as a double-sided tape.

The single-sided or double-sided tape may be used to position between, pinch together, wrap around, or otherwise hold together the surfaces 10, 20.

The single-sided or double-sided tape may utilize the releasable adhesive 100 in a non-conductive form or with conductive doping, using the embedded material 120. For example, the releasable adhesive 100 may be in the form of a conductive, single-sided tape, which may be used to secure the surfaces 10, 20 to one another and pass electrical currents through one another and the single-sided tape, as seen in FIG. 4.

III. Releasable Adhesive Application

FIG. 5 illustrates a tape dispenser 300 for applying the releasable adhesive 100 to an attaching surface (e.g., a component or subcomponent). Where the surfaces 10, 20 need to be held together prior to a subsequent manufacturing operation, the releasable adhesive 100 may allow assembly of components and subcomponents without the use of a fixture (fixtureless). The tape dispenser 300 may be a conventional off-the-shelf dispenser used to apply tape (e.g., single-sided or double-sided) to a surface.

Tape can be dispensed in one continuous length or several smaller segmented pieces to join the surfaces 10, 20. Continuous length may be desirable where at least one of the surfaces 10, 20 have a large flat area. However, smaller segmented pieces may be desirable where at least one of the surface 10, 20 includes curvature or other complex contours.

In some embodiments, the tape dispenser 300 has a radius 320 that allows the releasable adhesive 100 be dispensed at a specific angle with respect to the attaching surface (e.g., first surface 10). For example, where the radius 320 is small (e.g., between about 2 and about 5 cm), the releasable adhesive 100 can be dispensed at an angle that is near the attaching surface (e.g., between about 0 and about 20 degrees from the attaching surface). Attaching the releasable adhesive 100 to the attaching surface at a shallow angle may be beneficial in situations in which the adhesive is being applied to a component with limited surface area (e.g., small subcomponents). However, where the radius 320 is larger (e.g., between about 10 and about 15 cm), the releasable adhesive 100 can be dispensed at an angle further from the attaching surface (e.g., between about 30 and about 45 degrees from the attaching surface). Attaching the releasable adhesive 100 to the attaching surface at a large angle may be beneficial in situations in which the adhesive is being applied to a component with large surface area (e.g., large components).

In some embodiments, the size of the radius 320 is determined based on the composition of the releasable adhesive 100. For example, where the primary material 110 is a thick polymer, the radius 320 may be larger to accommodate the primary material 110. However, where the primary material is a thin or light-weight polymer, the radius may be smaller.

Fixtures are used on assembly lines to position (e.g., precision position) and/or secure parts for subsequent manufacturing process. For example, a vehicle component may be placed into a fixture to precisely position and/or hold a subcomponent (e.g., using a weld tack), prior to a subsequent welding. The use of fixtures create assembly constraints due to the positioning of clamps and other tooling. Physical clamps and tooling interfere with welding paths, causing repositioning of welding devices (e.g., a laser) to be necessary, costing time and money. However, with fixtureless assembly, clamps and tooling are not necessary, therefore eliminating obstructions to welding.

In some fixtureless embodiments, the releasable adhesive 100 is a single-sided tape, which can be attached to the first surface 10 and then looped or otherwise turned to attach to the second surface 20. In other fixtureless embodiments, the releasable adhesive 100 is in the form of the double-sided tape described above, which attaches the first surface 10 to one side of the tape and attaches the second surface 20 to a second side of the tape.

In some embodiments, as seen in FIG. 5, tape including the releasable adhesive 100 includes ventilation holes 310 to allow escape of any gases, fumes, and other precipitant during subsequent manufacturing. The ventilation holes 310 are sized and spaced to allow passage of gases and fumes, while remaining strength to adhere the first surface 10 with the second surface 20. Once the surfaces 10, 20 are secured with the releasable adhesive 100, the surfaces 10, 20 can be welded or otherwise permanently joined.

In embodiment where the releasable adhesive 100 is in the form of a tape, the thickness of the tape may depend on a desired fit of the surfaces (e.g., whether a gap is desired between the first surface 10 and the second surface 20). A close fit (e.g., minimal or no gap) of the surfaces 10, 20 may be desired where components are at or near a surface visible to a consumer, whereas a gap may be desired where components are joined at or near a recessed channel or on a surface not visible to the consumer. For example, where a close fit is desired between the surfaces 10, 20, the thickness of the releasable adhesive 100 can be approximately 100 μm.

However, where a gap is desired between the surfaces 10, 20, the thickness of the releasable adhesive 100 can be between 200 μm and 2 mm.

FIG. 6 illustrates use of the releasable adhesive 100 to secure subcomponents to a component in a fixtureless application. As illustrated, the releasable adhesive 100, in a double-sided tape form, is used to secure three smaller subcomponents 360 to the larger component 350.

A first side of the double-sided tape contains the releasable adhesive 100 that attaches to the component 350. As illustrated, the first side of the double-sided tape is in contact with the component 350. The second side of the double-sided tape also contains the releasable adhesive 100 and is intended to receive the subcomponents 360. The subcomponents 360 are received onto the second side of the double-sided tape according to the illustrated arrows.

FIG. 7 illustrates the subcomponents 360 being secured to the component 350. In some embodiments, it is desirable to only temporarily secure the subcomponents 360 to the component 350. Where the double-sided tape alone is used, the subcomponent 360 are temporality joined to the components 350 because a peel force of a pre-determined magnitude will allow the first or second side of the double-sided tape to release the subcomponent 360.

In some embodiments, (e.g., that are illustrated in FIG. 8) the releasable adhesive 100 is used where joining surfaces 10, 20 (e.g., a surface of the component 350 and a surface of the subcomponent 360) need to be securely joined for functional operation. Secure joining can be beneficial to attach surfaces that are otherwise secured such using means such as gaskets or conventional adhesives. Unlike conventional adhesives or sealants, the releasable adhesive 100 does not require time to heat or cure and does not produce offgassing (of, e.g., volatile organic chemicals (VOC)). Large components (e.g., cylinder heads and blocks) and complex geometrical components (e.g., body panels) can also be securely joined using the releasable adhesive 100.

Secure joining of the surfaces 10, 20 (e.g., component 350 and subcomponents 360) is accomplished by using the releasable adhesive 100 in conjunction with one or more fasteners 370. The fastener(s) 370 functions to position the surfaces 10, 20 and prevents disjoining of the surfaces 10, 20 due to peel force. For example, the double-sided tape positions and holds the subcomponents 360 onto the component 350 until a more permanent joining process (e.g., welding) secures the components 350 and subcomponents 360. The fastener(s) 370 includes any securing device or joining technique suitable to permanently hold together the joining surfaces 10, 20, such as but not limited to mechanical fastener (e.g., nut/bolts) or welding (e.g., spot welding). As an example, the subcomponents 360 and the component 350 are temporality secured using the shear strength of the releasable adhesive 100, and spot welds or bolts are used for secure joining to prevent a peel force from removing the subcomponent 360 as would occur with the releasable adhesive 100 alone.

Benefits to utilizing the releasable adhesive 100 with the fastener(s) 370 include additional structural strength, additional sealing, and reduced noise and vibration. Structural strength is added because spot welds and mechanical fasteners alone have less strength than when combined with the releasable adhesive 100. Sealing is added because the releasable adhesive 100 (e.g., the primary material 110) is pliable to conform to any number of curvatures or complex contours. Additionally, noise, vibration, and harshness (NVH) is reduced because the pliability of the releasable adhesive 100 dampens rattling and vibration of components after joining.

IV. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A releasable adhesive system, for joining a first surface to a second surface, comprising:
    a primary material having (i) a first portion including at least one first-portion molecule configured to be positioned parallel with at least one first-surface molecule of the first surface, and (ii) a second portion, opposite the first portion, including at least one second-portion molecule configured to be positioned parallel with at least one second-surface molecule of the second surface, wherein:
    the primary material is shaped into a plurality of components, each component being positioned at a location and extending in a single direction outward from the location and forming a generally flat surface opposite the location, the plurality of components forming a plurality of independent bonds with the first surface at the generally flat surfaces, and
    the first-portion molecule, positioned parallel with the first-surface molecule, is configured to (a) maintain a bond between the first portion and the first surface up to a pre-determined shear force being exerted on the first surface and (b) release the bond between the first portion and the first surface in response to at least a pre-determined peel force exerted on the first surface.

2. The releasable adhesive system of claim 1, wherein the second-portion molecule, when positioned parallel with the second-surface molecule, is configured to:
    maintain a bond between the second portion and the second surface up to a pre-determined shear force being exerted on the second surface; and
    release the bond between the second portion and the second surface in response to a pre-determined peel force exerted on the second surface.

3. The releasable adhesive system of claim 1, wherein the primary material includes ventilation holes allowing passage of gas and fumes through the first portion or the second portion.

4. The releasable adhesive system of claim 1, wherein the first surface is permanently jointed to the second surfaces by fastening at least a section of the first surface to at least a section of the second surface.

5. A releasable adhesive system, for joining a first surface to a second surface, comprising:
    a primary material having (i) a first portion including at least one first-portion molecule configured to be positioned parallel with at least one first-surface molecule of the first surface, and (ii) a second portion, opposite the first portion, including at least one second-portion molecule configured to be positioned parallel with at least one second-surface molecule of the second surface, wherein:

the primary material is shaped into a plurality of components, each component being positioned at a location and extending in a single direction outward from the location and forming a bonding surface generally parallel to and opposite the location, the plurality of components forming a plurality of independent bonds with the first surface at the bonding surface, and the first-portion molecule, positioned parallel with the first-surface molecule, is configured to (a) maintain a bond between the first portion and the first surface up to a pre-determined shear force being exerted on the first surface and (b) release the bond between the first portion and the first surface in response to at least a pre-determined peel force exerted on the first surface.

6. The releasable adhesive system of claim 5, wherein the second-portion molecule, when positioned parallel with the second-surface molecule, is configured to: maintain a bond between the second portion and the second surface up to a pre-determined shear force being exerted on the second surface; and release the bond between the second portion and the second surface in response to a pre-determined peel force exerted on the second surface.

7. The releasable adhesive system of claim 5, wherein the primary material includes ventilation holes allowing passage of gas and fumes through the first portion or the second portion.

8. The releasable adhesive system of claim 5, wherein the first surface is permanently jointed to the second surfaces by fastening at least a section of the first surface to at least a section of the second surface.

* * * * *